United States Patent [19]
Erasmus et al.

[11] Patent Number: 6,007,860
[45] Date of Patent: *Dec. 28, 1999

[54] PREPARING FOOD SUPPLEMENT

[75] Inventors: Udo Erasmus, Vancouver, Canada; Robert MacIntosh Collett, Granada Hills, Calif.

[73] Assignee: Designing Health, Inc., Velencia, Calif.

[ * ] Notice: This patent is subject to a terminal disclaimer.

[21] Appl. No.: 09/287,888

[22] Filed: Apr. 7, 1999

Related U.S. Application Data

[63] Continuation of application No. 09/143,796, Aug. 31, 1998, which is a continuation of application No. 08/850,273, May 3, 1997, Pat. No. 5,834,048, which is a division of application No. 08/606,073, Feb. 23, 1996, Pat. No. 5,656,312, which is a continuation-in-part of application No. 08/300,058, Sep. 2, 1994, abandoned.

[51] Int. Cl.$^6$ ....................................... A21D 4/00
[52] U.S. Cl. ..................... 426/324; 426/395; 426/331; 426/443; 426/518; 426/519; 241/6; 241/8; 241/260; 424/195.1; 424/641
[58] Field of Search ..................... 426/395, 118, 426/324, 331, 623, 629, 443, 518, 519; 241/6, 8, 260; 424/195.1, 641

[56] References Cited

U.S. PATENT DOCUMENTS

| | | |
|---|---|---|
| 2,069,265 | 2/1937 | Musher . |
| 2,282,786 | 5/1942 | Musher . |
| 2,282,818 | 5/1942 | Musher . |
| 2,793,952 | 5/1957 | Rawlings . |
| 3,015,563 | 2/1962 | Rosenberg . |
| 3,862,337 | 1/1975 | Osborne . |
| 3,883,676 | 5/1975 | Strommer . |
| 4,160,041 | 7/1979 | Schroeder . |
| 4,165,391 | 8/1979 | Corbett et al. . |
| 4,211,781 | 7/1980 | Chapman . |
| 4,212,892 | 7/1980 | Chahine . |
| 4,267,197 | 5/1981 | Sawhill . |
| 4,418,086 | 11/1983 | Marino et al. . |
| 4,610,397 | 9/1986 | Fischer et al. . |
| 4,737,365 | 4/1988 | Meyer . |
| 4,857,326 | 8/1989 | Stitt ........................ 424/195.1 |
| 4,963,356 | 10/1990 | Calenoff ........................... 424/91 |
| 5,069,903 | 12/1991 | Stitt ........................ 424/195.1 |
| 5,110,592 | 5/1992 | Stitt ........................ 424/195.1 |
| 5,145,678 | 9/1992 | Gakic ....................... 424/195.1 |
| 5,354,818 | 10/1994 | Vazza . |
| 5,604,249 | 2/1997 | Holfe . |
| 5,612,074 | 3/1997 | Leach . |
| 5,656,312 | 8/1997 | Erasmus et al. ................ 426/89 |
| 5,801,026 | 9/1998 | Somerville . |
| 5,821,264 | 10/1998 | Lane . |
| 5,830,887 | 11/1998 | Kelly ............................... 514/182 |
| 5,834,048 | 11/1998 | Erasmus et al. ................ 426/395 |

FOREIGN PATENT DOCUMENTS 0678247  10/1995  European Pat. Off. .

OTHER PUBLICATIONS

"Flax Facts", Randolf & James Flax Mills Ltd., Saskatchewan, Canada (Date Unknown).

*Primary Examiner*—Nina Bhat
*Attorney, Agent, or Firm*—Oppenheimer, Wolf & Donnelly, LLP

[57] ABSTRACT

A composition and method for preparing a food supplement. The composition consisting essentially of at least 70% by weight of an oil seed constituent, at least 8% by weight of an additional plant constituent and at least 4% by weight of yeast wherein oil seed constituent, additional plant constituent and yeast are prepared by blending and cutting for less than about 20 minutes at a temperature of less than about 100° F. and in the presence of light of a wavelength not greater than that of red light and of an intensity not greater than that of a darkroom light to thereby inhibit oxidation of the components of the composition. The method comprising combining at least 70% by weight of an oil seed constituent, at least 8% by weight of an additional plant constituent, and at least 4% by weight of yeast wherein oil seed constituent seed with a liquid coating solution, cutting and blending the constituents, packaging the cut and blended constituents in an opaque, oxygen impermeable pouch, expelling oxygen from the pouch and sealing the pouch.

23 Claims, No Drawings

6,007,860

PREPARING FOOD SUPPLEMENT

RELATED APPLICATIONS

This application is a continuation of U.S. patent application Ser. No. 09/143,796, filed Aug. 31, 1998, which is a continuation of U.S. patent application Ser. No. 08/850,273, filed May 3, 1997, now U.S. Pat. No. 5,834,048, which is a divisional of U.S. patent application Ser. No. 08/606,073, filed Feb. 23, 1996, now U.S. Pat. No. 5,656,312, which is a continuation-in-part of U.S. patent application Ser. No. 08/300,058, filed Sep. 2, 1994, now abandoned.

FIELD OF THE INVENTION

The present invention relates to the field of nutrition and preventative health measures through a dietary formulation.

BACKGROUND OF THE INVENTION

Diet is importance in determining general health, work performance, energy level and appearance. A diet must include proper amounts of essential nutrients. Essential nutrients are those that an animal is incapable of synthesizing and therefore, must be obtained from the diet of the animal. Essential nutrients are different for different animals. Of the approximately forty essential nutrients necessary for humans, fourteen are minerals, fourteen are vitamins, ten are amino acids and two are essential fatty acids. Other non-essential, but beneficial, factors include enzymes, beneficial bowel bacteria and certain kinds of fiber. These factors can become essential when the diet contains highly processed foods.

Extensively processed foods cannot provide all the nutritional requirements for optimum animal or human health because processing destroys chemically fragile essential nutritional elements. For example, processing steps may expose the carbon—carbon double bonds in hydrocarbon chains of essential fatty acids to oxidizing agents such as light and oxygen. Oxidized fatty acids lose their nutritional value. Humans and animals suffer from a nutritional deficiency as a result of consumption of a diet which is largely composed of processed foods. Despite the deficiencies of processed foods they have become popular due to the ease, speed and convenience with which meals can be prepared.

There is a need for a food supplement containing the missing essential nutrients to supplement the diet of processed food consumers.

SUMMARY OF THE INVENTION

The present invention is directed at a food supplement composition and method for preparing the food supplement composition. The composition consists essentially of at least 70% by weight of an oil seed constituent, at least 8% by weight of an additional plant constituent and at least 4% by weight of yeast. The oil seed constituent, additional plant constituent and yeast are prepared by blending and cutting for less than about 20 minutes at a temperature of less than about 100° F. and in the presence of light of a wavelength not greater than that of red light and of an intensity not greater than that of a darkroom light to thereby inhibit oxidation of the components of the composition.

The method comprising combining at least 70% by weight of an oil seed constituent, at least 8% by weight of an additional plant constituent, and at least 4% by weight of yeast wherein oil seed constituent seed with a liquid coating solution, cutting and blending the constituents, packaging the cut and blended constituents in an opaque, oxygen impermeable pouch, expelling oxygen from the pouch and sealing the pouch.

DETAILED DESCRIPTION

The present invention describes animal and human dietary food supplement compositions and methods for preparing the compositions. Preparation of the supplement using the methods of the invention minimizes chemical changes in chemically reactive molecules, particularly in the unsaturated carbon—carbon double bonds of hydrocarbon chains in fatty acids of plant and/or animal constituents.

Composition of the Food Supplements

The components of the food supplement compositions of the present invention for humans and animals consist of about 10 major ingredients, which will be termed "Macro Ingredients", and about nine minor ingredients, which will be termed "Micro Ingredients". These Macro and Micro Ingredients are combined in different combinations to produce supplements for humans, dogs, cats, horses, rodents, ferrets, so fox, mink, rabbits, hamsters, gerbils, reptiles, birds and pocket pets. Pocket pets include, but are not limited to, mice, rats, and guinea pigs. The various supplements contain different percentages by weight of the ingredients, and some contain ingredients that are not included in other supplements. For example, vegetarian supplements do not include ingredients of animal origins.

The Macro Ingredients include one or more of:

(1) a seed product selected from the group consisting of flax, hemp, buckwheat, sunflower and sesame, and mixtures thereof;

(2) a coating selected from the group consisting of viscous liquids or spray-dried viscous liquids such as molasses, honey, glycerin, other viscous liquids and mixtures thereof;

(3) fatted rice bran;

(4) yeast;

(5) powdered liver;

(6) alfalfa leaf powder;

(7) bone meal;

(8) powdered carrot;

(9) powdered apple, and

(10) fish meal.

The Micro Ingredients include one or more of:

(1) oyster powder from whole, freeze dried oysters;

(2) powdered kelp;

(3) powdered garlic;

(4) deoiled soybean lecithin (soy phospholipids);

(5) other nutrients deemed essential for the specific application under consideration; and (6) equisetum or other herbs deemed beneficial to the application under consideration.

All ingredients are of a quality which is fit for human consumption.

The coating materials are molasses, honey, glycerin, other suitable viscous liquid or combinations thereof. In a preferred embodiment the viscous liquid coating is spray-dried and added to the other components in the dry, rather than the liquid, form. These coating liquids inhibit reactions of desirable molecules, in the food, resulting from exposure to light and/or oxygen. The coating aids in the preservation of naturally occurring antioxidants found in the supplement components. The natural antioxidant include tocopherols, carotenes, quinones, sterols, terpenes, bioflavonoids, polyphenols, polycyclic anthraquinones and antioxidant pigments and are in the components of the supplements.

Prooxidant metals are also excluded from the supplements to minimize oxidation of the components of the supplement.

The percentage by weight of the Macro Ingredients is best defined by considering the seeds, coating material and remaining ingredients separately. Grains and seeds typically comprise 30% to 90%, preferably 60% to 80%, and most preferably 70% to 75% of a particular supplement blended for a human or specific animal. Unless other wise stated all percentages used are by weight.

The coating material (molasses, honey, or glycerine, liquid or spray dried) typically comprises 3% to 16%, preferably 6% to 12%, and most preferably 7% to 10% of a particular supplement blended for a human or specific animal.

The "remaining ingredients" typically comprise 7% to 38%, preferably 15% to 25%, but most preferably 18% to 22%, depending on the specific animal or human for which the supplement is intended, and on palatability considerations. Rice bran, yeast and liver typically comprise the larger percentages of the "remaining ingredients", preferably 8% to 18%, but most preferably between 14% and 16%. Alfalfa, carrot, apple, bone meal, and fish meal typically comprise 1% to 12%, preferably 2% to 7%, but most preferable between 4% and 6%, depending on if the supplement is formulated for a human or a specific animal and on palatability considerations. Formulations can vary greatly, depending on the species. Effective, and palatable, examples of supplements for dogs, cats, horses, foxes/minks, rabbits and humans are shown in Table I.

The Micro Ingredients typically comprise from 0.2% to 4% of a particular supplement, primarily depending on the type of animal. Preferably, these ingredients comprise 0.5% to 2.5%, and most preferably 1% to 2% of a particular supplement. The amount of each specific Micro Ingredient is strongly related to the animal type. For example, fish and oyster are not usually part of the horse supplement and kelp is higher in the cat supplement than either dog or, particularly, horse supplement. Table I also shows examples of most preferable combinations of the Micro Ingredients.

In order that the invention described herein may be more fully understood, the following examples are set forth as illustrations of the invention. It should be understood that these examples are for illustrative purposes only and are not to be construed as limiting the scope of this invention in any manner.

EXAMPLE 1

A Method for Preparing the Food Supplement Using Coating Liquids

The method of this example involves the use of coating liquids (molasses, honey, glycerin, or other comparable liquids). According to this method, the grains and seed are first reduced in size by grinding. The grinding process is most preferably done under dark room conditions. All other ingredients are weighed out prior to the grinding step. This is done to keep the time from grinding to packaging and sealing to a minimum. Suitable methods of grinding can be determined by those skilled in the art, but, by way of example, include roller mill or similar grinder or cutter equipment. It should be noted that most preferably the temperature during size reduction should not exceed 100° F. (37.8° C.). Typically, the grains and seeds are ground to an extent that results in 5% to 35% of a representative sample passing through a #30 U.S. Standard screen. Preferably, the amount passing through the #30 screen is 8% to 25%, and most preferably 10% to 20%. Examples of screen analysis for size reduction are shown in Table II.

TABLE I

Typical Formulations for Some Animals and Humans

| Ingredient | Dog | Cat | Horse | Fox/Mink | Rabbit | Human |
|---|---|---|---|---|---|---|
| MACRO | | | | | | |
| Flax | 71%[1]/73[2] | 71%/73% | 71%/73% | 71%/73% | 71%/73% | 71%/73% |
| Molasses | 9.5%/7.5% | 9.5%/7.5% | 9.5%/7.5% | 9.5%17.% | 9.5%/7.5% | 9.5%/7.5% |
| Yeast | 5% | 5% | 4% | 5% | 5% | 5% |
| Rice/Bran | 5% | 5% | 6% | 5% | 6% | 6% |
| Liver | 4% | 4% | 1% | 4% | 1% | 2% |
| Alfalfa | 2% | 2% | 3.5% | 2% | 3.5% | 2% |
| Bone | 1.5% | 1% | 0.5% | 1% | 0.5% | 1% |
| Carrot | 1% | 1% | 2.5% | 1% | 2.5% | 2% |
| Fish Meal | 0.5% | 1% | 0% | 0.10% | 0% | 0% |
| Apple | 0% | 0% | 1.5% | 0% | 0.5% | 2% |
| MICRO | | | | | | |
| Oyster | 0.1% | 0.2% | 0% | 0.1% | 0% | 0% |
| Kelp | 0.1% | 0.15% | 0.02% | 0.1% | 0.2% | 0.07% |
| Lecithin | 0.05% | 0.05% | 0.03% | 0.03% | 0.03% | 0.01% |
| Garlic | 0.01% | 0.01% | 0.01% | 0.01% | 0.01% | 0.01% |
| Taurine | 0% | 0.05% | 0% | 0.02% | 0% | 0.02% |
| Equisetum Herb | 0% | 0% | 0% | 0% | 0% | 0.01% |
| Carnitine | 0% | 0% | 0% | 0% | 0% | 0.01% |

[1]Percent by Weight
[2]Liquid/Dry

TABLE II

| test 1 Ground through a Coffee Bean Plate-Type Grinder | | test 2 Ground in a rollermill | |
|---|---|---|---|
| Standard Gauge Size | % Passing through Screen | Standard Gauge Size | % Passing through Screen |
| +10 U.S. | 0.7% | +10 U.S. | 3.3% |
| +16 U.S. | 46.4% | +16 U.S. | 52.5% |
| +20 U.S. | 23.2% | +20 U.S. | 24.2% |
| +30 U.S. | 10.2% | +30 U.S. | 9.2% |
| −30 U.S. | 19.6% | −30 U.S. | 10.8% |

The next step in Example 1 is a mixing process. The ground grains and seeds are immediately transferred to the bowl of a mixer, such as a Hobart mixer (other types of mixers are also suitable). Most preferably, the coating liquid is added and allowed to blend with the ground seed until the particles are coated (about 1 to 2 minutes). The premixed Macro Ingredients and Micro Ingredients are then added. These are first prepared by blending the Micro Ingredients with an appropriate blender, such as a Crossley Economy MDL EE type blender with intensifier bar. The blended Micro Ingredients are then combined with the Macro Ingredients using, for example, a Hobart mixer or a "V" type blender.

With all ingredients combined with the coated grain component in the mixer, a blending period of 10 minutes is typically used, but more preferably 8 minutes and most preferably 5 minutes. The thoroughly blended supplement is transferred to an automatic weigher/filler, such as an All Fill type machine that dispenses the desired to amount of product into the package. The above details of this Example 1 are in the way of an example of a batch type process. Other equipment and equipment combinations, such as continuous processing, can readily be determined by those skilled in the art of process and production engineering.

This method of preparing the present invention, including packaging and sealing in opaque, oxygen impermeable containers typically is accomplished in 16 to 20 minutes, but preferably in 12 to 16 minutes, and most preferably in 8 to 12 minutes, under dark room conditions and with no stage of the process raising the temperature above 100° F. (37.8° C.).

While not wanting to be bound by any particular explanation, it is believed that the preparation of the food supplement of the present invention by this method results unexpectedly in general and specific improvements in human and in animal health due to preservation of the component ingredients in their natural state by the action of:

1) the coating of the ingredient particles with the appropriate liquid (molasses, honey, or glycerin);
2) the minimizing of exposure to light;
3) the minimizing of exposure to oxygen;
4) the minimizing of exposure to heat;
5) the minimizing of the time lapsed between size reduction and sealing in an opaque, oxygen barrier container;
6) preserving naturally occurring antioxidants and other protective molecules;
7) the exclusion of prooxidant metals; and
8) the presence of the antioxidant properties of other fiber ingredients included in the formulation (for example, rice bran).

EXAMPLE 2

A Method of Preparing the Food Supplement Using Dry Ingredients

This method of producing this present invention requires the use of a high speed cutting process using the "comminutor" principle of size reduction/blending of the ingredients. More particularly, this method incorporates the unique concept of simultaneous size reduction and intimate blending of the premixed supplement ingredients, including whole, unground grains and seeds and powdered (dry) additional ingredients, using an arrangement of equipment to rapidly move the ingredients into opaque, oxygen barrier packaging in under 5 minutes, most preferably in under 2 minutes. Specifically, the concept of, and the equipment for, accomplishing a one step process of premixed ingredients through a high speed size reduction/blending and thence directly into opaque, oxygen barrier packaging is unique.

The premix of all the formula ingredients including the whole, unground oil seed, with the use of powdered forms of molasses, honey or glycerin, allows for staged and inventoried material. This material is stable until further processing and is ready, in the quantities desired, for the comminutor process. The high speed, simultaneous size reduction and intimate blending, releases the natural oils, essential fatty acids and naturally occurring antioxidants which then coat the other ingredients. This gives the supplement formulation an effective temporary stabilization against oxidation and free radical chemical reactions. The addition of special packaging and handling of the product when opened extends the period of stabilization for at lease 90 days from the date of production.

The process was developed in cooperation with Urschel Laboratories, Inc., using their Comitrol Processor Model 1700. Research in cooperation with Urschel in which the concept of this present invention of using the proper combination of impellers, cutterhead design, cutterhead knife spacing and machine "rpm" to simultaneously and intimately reduce in size and blend the formula ingredients is unique. The ability to produce a dry product by this method was a surprising and expected result as it was expected that the dry products would: plug or jam the machine; raise the processing temperature above 100° F. (37.8° C.); not be accomplished at satisfactory "production" rates; or leave grains and seeds uncut or unsatisfactorily cut and poorly blended with the other ingredients.

Urschel equipment is size reduction equipment, not thought to be used in a simultaneous size reduction/blending process at low temperatures (under 100° F.; 37.8° C.). Preferably, the Urschel 1700 Comitrol Processor is fitted with a 15 to 45 horsepower motor, either a 30 blade impeller or straight impeller, a type "B", three inch high slicing head or cutting head with 0.010 thousandths of an inch horizontal thickness of separators, and 0.010 to 0.080 thousandths of an inch opening between horizontal separators, operating at 2,200 to 6,000 rpms. More preferably, the Urschel Model 1700 Comitrol Processor is fitted with a 30 horsepower motor, straight impeller, a type "B", 3 inch high cutting head with 0.010 thousandths of an inch horizontal thickness of separators, and 0.020 to 0.060 thousandths of an inch opening between horizontal separators, operating between 2,500 and 5,800 rpm's. Most preferably, the Urschel 1700 Comitrol Processor is fitted with a 30 horsepower motor, straight impeller, type "B", 3 inch high cutting head with 0.010 thousandths of an inch thickness of separators, and 0.040 thousandths of an inch opening between horizontal separators, operating between 3,600 and 5,650 rpm's.

The steps in this method, then, are mixing of all ingredients, including a spray-dried form of blackstrap molasses and whole, unground grains and seeds, in a "V" blender of a size appropriate for the production capacity desired. This mixing process only requires that a thorough blending of the ingredients take place and can be accomplished in a variety of mixer or blender types familiar to those skilled in the art of blending equipment. This premix of ingredients is ready for the Comitrol Processor and can be inventoried (stored or staged) in mini bulk bags, barrels, or other suitable containers until said processing step is initiated. Operating production rates for the Comitrol process are between 2,000 and 3,000 pounds per hour depending on the rpm selected and how fine a grind is desired. Typically, a coarser blend is produced at 3,600 rpm and production feed rates of 2,000 pounds per hour (see A, Table III). Most preferably, a finer blend is produced at 5,634 rpm and production feed rates of 2,700 pounds per hour (see B, Table III).

TABLE III

| Test A 3,600 rpm, 2,000/lb/hr. | | Test B 5,634 rpm, 2,700/lb/hr. | |
| --- | --- | --- | --- |
| Standard Gauge Size | % Passing through Screen | Standard Gauge Size | % Passing through Screen |
| +10 | trace | +10 | 0% |
| +16 | 9% | +16 | 4% |
| +20 | 22% | +20 | 17% |
| +30 | 19% | +30 | 19% |
| −30 | 50% | −30 | 60% |

Other equipment that uses the "Comminutor" principle of size reduction may be appropriate to accomplish the results found using the Urshel Model 1700. For example, the model 194 or 197 Comitrol made by Quadro Engineering, with proper impellers and cutting screens. The Quadro equipment is preferred for small production rates.

Once the material exits the size reduction/blending step, it is directed into automatic weigher/dispenser machines (such as All fill automatic weigher/dispensers). A special component was developed to divide and direct the exiting material to several automatic weigher/dispensers, as production demands. The key factor is to set the rate the material exits the Comitrol to the rate the container lines are running. The container production line can be of any degree of sophistication to accomplish the production requirements and is readily determinable by one skilled in the art of production line engineering. The exiting supplement blend must be dispensed into and sealed in either opaque, oxygen impermeable pouches or into inert gas flushed, oxygen impermeable containers to which an oxygen absorber packet has been added, preferably in under 5 minutes, but most preferably in under 2 minutes.

In addition to the process being performed rapidly, the process is performed at a temperature under 100° F. (37.8° C.) and in the absence of white light (i.e. under dark room conditions).

While not wanting to be bound by any particular explanation, it is believed that by this one step process the supplement blend, when consistently fed to humans and/or animals over time, results in general and specific improvements in health due to preservation of the ingredients in their natural state by the action of:

1) an intimate blending and dispersing of the naturally occurring antioxidants over the particles;

2) the minimization of exposure to oxygen due to the one step processing technique;

3) the minimization of exposure to light due to the one step processing technique;

4) the minimization of exposure to heat;

5) the minimizing of lapsed time from exiting the Comitrol to sealing the supplement blend in opaque, oxygen barrier containers due to the one step processing technique;

6) the coating action of naturally occurring antioxidants and other related compounds (see "1)", above) caused by the action of the premixed ingredients being guided to the center of a high speed, rotating impeller in which the centrifugal force moves product outward to the impeller tips which carry it past the cutting edges of the stationary reduction head of the Comitrol Processor;

7) the exclusion of prooxidant metals; and 8) the antioxidant properties of other ingredients included in the formulation (such as rice bran).

EXAMPLE 3

A Rapid Method of Preparing the Food Supplement Using Dry Ingredients

The following ingredients, suitable for use as a supplement from dogs are weighed in the following proportions and mixed 72% flax, 8% spray-dried molasses, 5% yeast, 5% rice bran, 4% liver, 2% alfalfa, 1.5% bone, 1% carrot, 0.5% fish meal, 0.1% oyster, 0.1% kelp, 0.05% lecithin and 0.01% garlic. The mixture is then stored until required.

When required the mixture is cut in a high speed cutting process, as described in Example 2, operating at 5,634 rpm and production feed rates of 2,700 pounds per hour. After the cutting is completed the cut mixture is immediately packed into opaque, oxygen barrier packaging. The packages are then evacuated to remove oxygen and sealed. The process, from the commencement of cutting to sealing the cut ingredients in the packaging is completed in about 2 minutes. The process, from the commencement of cutting to sealing the cut ingredients in the packaging is conducted under "dark room conditions" as described above and at a temperature which does not exceed 100° F. (37.8° C.).

EXAMPLE 4

Feeding Trials for Dogs

Food supplements specifically formulated for dogs were prepared according to the process of Example 3 and fed to a total of 540 dogs for 60 days. Veterinarians then monitored the animals for changes in a variety of conditions.

The results of the feeding trials are shown in Table IV. The dogs showed remarkable improvements in a variety of conditions. For example, a number of conditions relating to skin and hair improved after animals were fed the diet. Hair shedding decreased in 385 of 385 dogs examined, and dandruff conditions similarly improved in 214 of 214 dogs examined. Energy levels for dogs older than eight years of age were increased in 197 of 270 dogs examined. The food supplements also improved conditions related to digestion, immune function, and energy levels in the dogs. Additional anecdotal evidence was noted for improvements in additional skin, hair, thyroid, digestive (including stool texture), immune conditions, arthritic conditions, respiratory diseases, renal disease, muscle pain, or in healing time following injury or surgery for canine, equine, and feline animals. The results of the feeding trials for dogs is summarized in Table IV.

TABLE IV

Results of Feeding Trials with Dogs

| Condition | # of dogs/ 540 | % of dogs | worse | no effect | some effect | cured | positive response/ total |
|---|---|---|---|---|---|---|---|
| doggy odor | 70 | 13% | 0 | 7 | 3 | 60 | 63/70 |
| wet, red, inflamed eyes | 127 | 25% | 0 | 14 | 88 | 30 | 113/127 |
| dry, flaky, dandruff skin | 214 | 40% | 0 | 0 | 47 | 167 | 214/214 |
| hot spots, eczema, inflamed skin | 138 | 26% | 0 | 26 | 55 | 57 | 112/138 |
| oily, seborrhea skin | 31 | 6% | 0 | 9 | 13 | 9 | 22/31 |
| dry, coarse hair | 283 | 32% | 0 | 0 | 68 | 215 | 283/283 |
| brittle, dull, lusterless hair | 232 | 43% | 0 | 7 | 47 | 178 | 225/232 |
| shedding hair | 385 | 71% | 0 | 27 | 127 | 231 | 385/385 |
| flea allergy | 97 | 18% | 0 | 13 | 84 | 0 | 84/97 |
| other allergies (incl. dermatitis) | 97 | 18% | 0 | 57 | 28 | 12 | 40/97 |
| auto-immune | 59 | 11% | 0 | 21 | 36 | 2 | 38/59 |
| stool texture (including constipation) | 97 | 18% | 0 | 0 | 42 | 55 | 97/97 |
| megacolon | 5 | 1% | 0 | 1 |  | 3 | 4/5 |
| smelly stool | 108 | 20% | 0 | 17 | 11 | 80 | 91/108 |
| stiffness, arthritis (8+ years) | 216 | 40% | 0 | 52 | 118 | 46 | 164/216 |
| low energy (8+ years) | 270 | 30% | 0 | 73 | 196 | 91 | 197/270 |
| low energy (1–8 years) | 108 | 20% | 0 | 51 | 32 | 25 | 57/108 |

EXAMPLE 5

Feeding Trials for Cats

Food supplements specifically formulated for cats were prepared according to the invention and fed to a total of 300 cats for 60 days. Veterinarians then monitored the animals for changes in a variety of conditions.

The results of the feeding trials are shown in Table V. The cats showed remarkable improvements in a variety of conditions. For example, a number of conditions relating to skin and hair improved after animals were fed the diet. Hair balls where reduced in 188 of 195 cats examined, and dandruff conditions similarly improved in 99 of 114 cats examined. Energy levels for older cats were increased in 84 of 238 cats examined.

TABLE V

Results of Feeding Trials with Cats

| Condition | # of cats/ 300 | % of cats | worse | no effect | some effect | cured | positive response/ total |
|---|---|---|---|---|---|---|---|
| hair balls, long-haired cats | 90 | 30% | 0 | 4 | 0 | 86 | 86/90 |
| hair-balls, short-haired cats | 105 | 35% | 0 | 3 | 0 | 102 | 102/105 |
| feline acne | 15 | 5% | 0 | 0 | 0 | 15 | 15/15 |
| dry, flaky dandruff skin | 114 | 38% | 0 | 15 | 11 | 88 | 99/114 |
| hot spots, eczema, inflamed skin | 18 | 6% | 0 | 3 | 6 | 9 | 15/18 |
| oily, seborrhea skin | 3 | 1% | 0 | 0 | 2 | 1 | 3/3 |
| dry, coarse hair | 90 | 30% | 0 | 0 | 14 | 76 | 90/90 |
| brittle, dull lusterless hair | 123 | 41% | 0 | 0 | 9 | 114 | 123/123 |
| shedding hair | 258 | 86% | 0 | 18 | 22 | 218 | 240/258 |
| flea allergy | 30 | 10% | 0 | 7 | 19 | 4 | 23/30 |
| other allergies (incl. derinatitis) | 24 | 8% | 0 | 0 | 22 | 2 | 24/24 |
| stool texture (incl. constipation) | 9 | 3% | 0 | 0 | 2 | 7 | 9/9 |
| diarrhea | 8 | 3% | 0 | 2 | 2 | 4 | 6/8 |

TABLE V-continued

Results of Feeding Trials with Cats

| Condition | # of cats/ 300 | % of cats | worse | no effect | some effect | cured | positive response/ total |
|---|---|---|---|---|---|---|---|
| fetid, smelly stool | 6 | 2% | 0 | 0 | 0 | 6 | 6/6 |
| stiffness, arthritis | 54 | 18% | 0 | 5 | 41 | 8 | 49/54 |
| low energy (older cats) | 238 | 46% | 0 | 54 | 63 | 21 | 84/238 |

While this describes what are at present to be the preferred embodiments of the invention, it will be clear to those skilled in the art that various changes and modifications may be made without departing from the invention. The invention is to be determined solely in terms of the following claims.

What is claimed is:

1. A method of preparing a food supplement comprising mixing ingredients including whole unground grains and seeds and substantially dry additional ingredients, the seeds including flax seed and the ingredients being size-reduced and blended into the supplement; and dispensing the size-reduced and blended ingredients into a light-impermeable, oxygen barrier packaging.

2. A method as claimed in claim 1 including premixing the ingredients; and directing the pre-mixed ingredients to the size-reduction and blending process and thereafter directly into opaque, oxygen barrier packaging as a dry product.

3. A method as claimed in claim 1 wherein the ingredients include whole, unground flax seed and at least one of powdered molasses, honey or glycerin.

4. A method as claimed in claim 1 wherein the size reduction and blending is affected in a comminutor process.

5. A method as claimed in claim 1 wherein the steps of size reducing and blending are a simultaneous procedure without the use of a liquid ingredient.

6. A method as claimed in claim 1 wherein the size reducing and blending process is affected at a temperature retained at less than about 100° F.

7. A method as claimed in claim 1 wherein the pre-mixing is affected in a blender, preferably a V blender.

8. A method as claimed in claim 1 including directing the size reduced material to a weigher and dispenser unit and affecting such weighing and dispensing.

9. A method as claimed in claim 1 including dispensing the supplement into an oxygen impermeable container.

10. A method as claimed in claim 1 wherein the oxygen impermeable container is opaque and is selectively flushed with inert gas or an oxygen absorber is added.

11. A method as claimed in claim 1 wherein the size-reduction, blending and dispensing into an oxygen impermeable packaging is affected in less than about 5 minutes.

12. A method of producing a food supplement including the steps of premixing and subsequently blending and size reducing ingredients including naturally occurring antioxidants and particles being flax seed constituent, and including other ingredients, minimizing the exposure of such antioxidants and particles to oxygen by affecting the blending and dispersing of the size-reduced particles in a single processing unit wherein the size-reduced and blended ingredients are subsequently directed to an oxygen impermeable container, and wherein the size-reduced and blended particles are processed under conditions directed through a procedure wherein the exposure to light, oxygen and heat is reduced.

13. A method as claimed in claim 12 wherein the action of the size reducing and blending of the premixed ingredients are affected by guiding the ingredients to the center of a high speed comminutor apparatus, and directing the ingredients through a rotating impeller in which the centrifugal forces move the ingredients to outward tips of the impeller thereby passing the cutting edges of a stationary reduction head of the comminutor apparatus.

14. A method as claimed in claim 13 wherein the process precludes the addition of preservatives of a chemical nature to preserve and stabilize the ingredients.

15. A method of preparing a food supplement comprising mixing supplement ingredients including whole unground grains and seeds and substantially dry additional ingredients wherein the seeds include flax seeds, such flax seeds being size-reduced and blended into the supplement; and dispensing the size-reduced and blended ingredients into an opaque, oxygen barrier packaging.

16. A method as claimed in claim 15 including premixing the ingredients comprising the flax seeds; and directing the pre-mixed ingredients to the size-reduction and blending process and thereafter directly into opaque, oxygen barrier packaging as a dry product.

17. A method as claimed in claim 15 wherein the ingredients include whole, unground flax seed and at least one of powdered molasses, honey or glycerin.

18. A method as claimed in claim 15 wherein the size reduction and blending is affected in a comminutor process.

19. A method as claimed in claim 15 wherein the steps of size reducing and blending are a simultaneous procedure without the use of a liquid ingredient.

20. A method as claimed in claim 15 wherein the size reducing and blending process is affected at a temperature retained at less than about 100° F.

21. A method as claimed in claim 20 including dispensing the supplement into an oxygen impermeable container.

22. A method as claimed in claim 20 wherein the oxygen impermeable container is opaque and is selectively flushed with inert gas or an oxygen absorber is added.

23. A method as claimed in claim 20 wherein the size-reduction, blending and dispensing into an oxygen impermeable packaging is affected in less than about 5 minutes.

* * * * *